United States Patent
Kammer et al.

(10) Patent No.: US 8,170,480 B1
(45) Date of Patent: May 1, 2012

(54) BYPASSING BLUETOOTH DISCOVERY FOR DEVICES IN A SPECIAL LIST

(75) Inventors: David Kammer, Seattle, WA (US);
Mark T. Davis, San Francisco, CA (US);
Eric Klein, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 529 days.

(21) Appl. No.: 10/083,312

(22) Filed: Feb. 25, 2002

(51) Int. Cl.
*H04B 7/00* (2006.01)

(52) U.S. Cl. ....... 455/41.2; 455/410; 455/411; 455/458; 455/507; 455/514; 455/565; 709/227; 709/228; 709/237

(58) Field of Classification Search .......... 455/418–420, 455/517–519, 565–567, 41.1–41.2, 410–411, 455/507, 514, 458, 550.1; 709/227, 228, 709/237
See application file for complete search history.

(56) References Cited

U.S. PATENT DOCUMENTS

| | | | | |
|---|---|---|---|---|
| 6,463,276 B1 * | 10/2002 | Jonsson | ...................... | 455/410 |
| 6,564,056 B1 * | 5/2003 | Fitzgerald | .................. | 455/435.1 |
| 6,590,928 B1 * | 7/2003 | Haartsen | ...................... | 375/134 |
| 6,697,638 B1 * | 2/2004 | Larsson et al. | ............. | 455/553.1 |
| 6,701,160 B1 * | 3/2004 | Pinder et al. | ................ | 455/550.1 |
| 2002/0044549 A1 * | 4/2002 | Johansson et al. | ............ | 370/386 |
| 2002/0090912 A1 * | 7/2002 | Cannon et al. | .................. | 455/41 |
| 2003/0045272 A1 * | 3/2003 | Burr | .............................. | 455/411 |

FOREIGN PATENT DOCUMENTS

WO    WO 02/09362    *    1/2002

OTHER PUBLICATIONS

Bluetooth Wireless Hands Free Car Kit, User's Guide, Motorola Bluetooth, 25 pages, 2002.

* cited by examiner

*Primary Examiner* — Tuan A Tran

(57) ABSTRACT

A method and apparatus for bypassing Bluetooth discovery for devices in a special list. A first Bluetooth device identification (ID) may be stored on a second device. A friendly name may be associated with the stored device ID. The first Bluetooth device ID may be accessed on the second device. An associated friendly name may be displayed as a representation of the first Bluetooth device id. A user of the second device may select to initiate Bluetooth communications with the first device. If so chosen, a Bluetooth communication session may be established between the two devices in a manner that bypasses the Bluetooth discovery process for these devices. In this novel manner, Bluetooth communication sessions may be established with trusted devices. Further, the time and power required for a Bluetooth discovery process may be conserved. In addition, the user interface may be improved over a user interface requiring Bluetooth discovery.

18 Claims, 13 Drawing Sheets

BYPASSING BLUETOOTH DISCOVERY FOR DEVICES IN A SPECIAL LIST

FIELD OF THE INVENTION

Embodiments of the present invention relate to hand held computer systems. More particularly, embodiments of the present invention provide a method and apparatus for establishing Bluetooth communications among several hand held computer systems.

BACKGROUND ART

It is often desirable to share information in an electronic form with others in order to better communicate an idea. Bluetooth communication has been developed as an industry standard to enable many devices, typically, though not necessarily, portable devices, to communicate wirelessly over short distances at relatively low power levels.

Bluetooth's great strength as an open, interoperable standard is also a challenge. For example, if a Bluetooth-enabled device accepts incoming connection requests, its user may end up receiving many connection requests from other Bluetooth users. Responding to these requests, most of which responses will typically be to reject the connection, is a time consuming annoyance. Yet the option of not accepting incoming connection requests may automatically reject those few that are actually desired.

In addition to the nuisance factor, responding to connection requests consumes valuable energy, which is a precious resource for portable electronics. Not only does it take power to operate the Bluetooth radio and transmit rejection messages, but turning on a display and interacting with a user is typically an even greater energy burden.

Further, there are many security concerns with Bluetooth. Because it is an open standard, designed for interoperability, it is possible for essentially all Bluetooth-enabled devices to communicate with other Bluetooth devices. Hence, it is quite possible for one device to pretend that it is actually another, which is known in the security arts as a spoofing attack. While this may be detected at the lower levels of the Bluetooth protocol, such a spoof might not be obvious to a user making an accept/reject decision about an incoming connection request. And a spoofed connection may introduce virus software or steal valuable information.

Importantly, the process of one Bluetooth-enabled device finding another Bluetooth device to communicate with, known as "Bluetooth Discovery," is a time consuming, power hungry process. During discovery, a Bluetooth transceiver may send inquiry messages on a periodic basis in an attempt to find another Bluetooth-enabled device. Likewise, Bluetooth transceivers wishing to be "discovered" must periodically turn on and listen for such inquiry messages.

Because of potential differences in the periodic schedules of different Bluetooth devices and possible radio interference, it may takes many tens of seconds to successfully transmit and receive an inquiry message after two devices come within communication range. Once an inquiry message is received, the receiving device will typically send an inquiry response packet (message) containing, among other things, its Bluetooth Device Address. This subsequent exchange may take several seconds per device.

Consequently, developing a list of potential Bluetooth communication "partners" via the Bluetooth Discovery process may require upwards of half a minute, all the while consuming relatively high levels of power for RF transceivers and protocol processing. This is generally seen as an excessive burden to impose on the human users of Bluetooth-enabled devices, such as mobile phones and hand held computers.

SUMMARY OF THE INVENTION

Therefore, it would be advantageous to provide a method and system for bypassing Bluetooth discovery for devices in a special list. A further need exists for a method to identify devices attempting a Bluetooth connection. A still further need exists for automatically rejecting connection requests from non trusted devices.

Accordingly, embodiments of the present invention provide a method and system for bypassing Bluetooth discovery for devices in a special list. Further embodiments implement a method to identify devices attempting a Bluetooth connection. Still other embodiments may automatically reject connection requests from non trusted devices.

A method and apparatus for bypassing Bluetooth discovery for devices in a special list are disclosed. A first Bluetooth device identification (ID) may be stored on a second device. A friendly name may be associated with the stored device ID. The first Bluetooth device ID may be accessed on the second device. An associated friendly name may be displayed as a representation of the first Bluetooth device id. A user of the second device may select to initiate Bluetooth communications with the second device. If so chosen, a Bluetooth communication session may be established between the two devices. In this novel manner, Bluetooth communication sessions may be established with trusted devices. Further, the power required for a Bluetooth discovery process may be conserved. In addition, the user interface may be improved over a user interface requiring Bluetooth discovery.

DETAILED DESCRIPTION OF THE INVENTION

Figure 1:
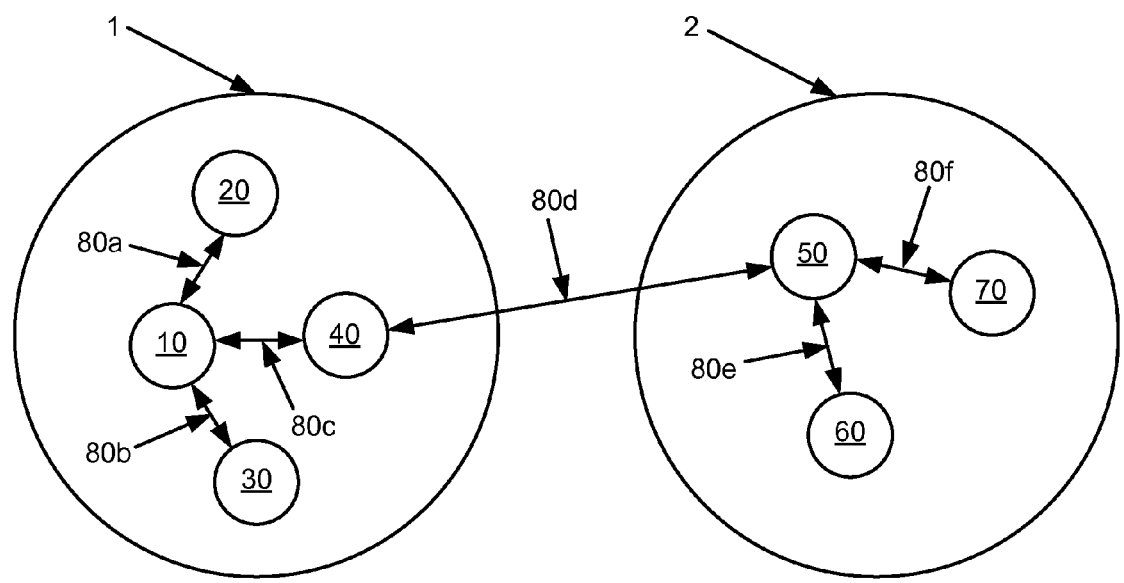
FIG. 1 illustrates a topology of a network of devices coupled using wireless connections in accordance with one embodiment of the present invention.

In the following detailed description of the present invention, bypassing Bluetooth discovery for devices in a special list, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 700 and 800) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or "erasing" or "transferring" or "establishing" or "drawing" or "updating" or "initiating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Bypassing Bluetooth Discovery for Devices in a Special List

The present invention is described in the context of a hand held computer system. However, it is appreciated that the present invention may be utilized in other types of portable electronic devices where it may be desirable to communicate wirelessly.

Bluetooth is the trade name for a technology specification for small form factor, low-cost, short-range radio links between personal computers (PCs), hand held computers, mobile phones and other devices and appliances. However, it is appreciated that the present invention may be utilized with devices and systems compliant with standards different from Bluetooth, such as the IEEE (Institute of Electronic and Electrical Engineering) 802.11 standard.

The Bluetooth technology allows cables that typically connect one device to another to be replaced with short-range radio links. Bluetooth is targeted at mobile and business users who need to establish a link, or small network, between their computers, cellular phone and other peripherals. The required and nominal range of Bluetooth is thus set to approximately ten (10) meters. To support other uses, for example the home environment, Bluetooth can be augmented to extend the range to up to 100 meters.

The Bluetooth technology is based on a high-performance, yet low-cost, integrated radio transceiver. For instance, Bluetooth transceivers built into both a cellular telephone and a hand held computer system would replace the cables used today to connect a hand held to a cellular telephone. Bluetooth radio technology can also provide: a universal bridge to existing data networks; a peripheral interface; and a mechanism to form small private ad hoc groupings of connected devices away from fixed network infrastructures.

FIG. 1 illustrates a topology of a network of devices coupled using wireless connections in accordance with one embodiment of the present invention. In the parlance of Bluetooth, a collection of devices connected in a Bluetooth system are referred to as a "piconet" or a "subnet." In the present embodiment, a piconet starts with two connected devices, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 10, 20, 30 and 40 are coupled in piconet 1 using wireless connections 80*a-c*. Similarly, devices 50, 60 and 70 are coupled in piconet 2 using wireless connections 80*e-f*. Piconet 1 and piconet 2 are coupled using connection 80*d*, which may be wireless or carried over another type of network. Devices 10-70 can be printers, personal digital assistants (PDAs), desktop computer systems, laptop computer systems, cell phones, fax machines, keyboards, and joysticks equipped with a Bluetooth radio transceiver or adapted to communicate with Bluetooth devices ("Bluetooth-enabled"). In accordance with the present invention, devices 10-70 can also be virtually any type of device, including mechanical devices and appliances, equipped with a Bluetooth radio transceiver or Bluetooth-enabled. The Bluetooth radio transceiver may be integrated into the device, or it may be coupled to the device.

Figure 2:
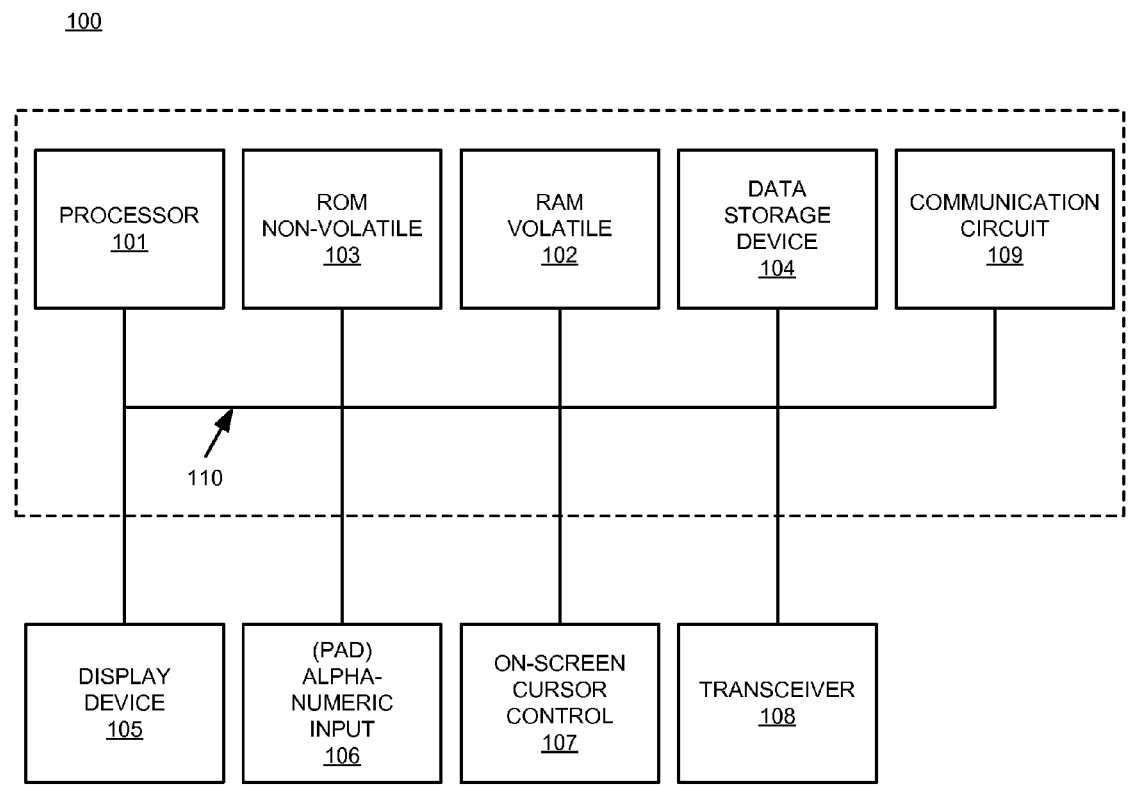
FIG. 2 is a block diagram of a portable computer system upon which embodiments of the present invention can be implemented.

FIG. 2 is a block diagram of a portable computer system 100 (e.g., a PDA, a hand-held computer system, or palmtop computer system) upon which embodiments of the present invention can be implemented. Computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Computer system 100 also includes an optional peripheral expansion device 104 (e.g., secure digital card, memory stick, compact flash, PCMCIA) coupled with the bus 110 for storing information, instructions and adding function (for example a Bluetooth communications subsystem) to a host device. Peripheral expansion device 104 can be removable.

Computer system 100 also contains a display device 105 coupled to the bus 110 for displaying information to the computer user. The display device 105 utilized with computer system 100 may be a liquid crystal display device, a cathode ray tube (CRT), a field emission display device (also called a flat panel CRT) or other display device suitable for generating graphic images and alphanumeric characters recognizable to the user. In one embodiment, display device 105 is a flat panel display.

Computer system 100 also includes a cursor control or directing device (on-screen cursor control 107) coupled to bus 110 for communicating user input information and command selections to processor 101. In one implementation, on-screen cursor control device 107 is a touch-screen device incorporated with display device 105. On-screen cursor control device 107 is capable of registering a position on display device 105 where a stylus makes contact.

Also included in computer system 100 of FIG. 2 is an input device 106 that in one implementation is a stroke or character recognition pad (e.g., a "digitizer"). Input device 106 can communicate information and command selections to processor 101. Input device 106 is capable of registering a position where a stylus (or an element having the functionality of a stylus) makes contact. Input device 106 also has the capability of registering movements of a stylus (or an element having the functionality of a stylus) across or above the surface of input device 106.

With reference still to FIG. 2, transceiver 108 is coupled to bus 110 and enables computer system 100 to communicate wirelessly with other electronic devices coupled in a piconet or scatternet (refer to FIG. 1). It should be appreciated that within the present embodiment, transceiver 108 is coupled to an antenna and provides the functionality to transmit and receive information over a wireless communication interface. In one embodiment, transceiver 108 is a Bluetooth device. Additional information with regard to the Bluetooth embodiment is provided in conjunction with FIGS. 4A and 4B. It is appreciated that transceiver 108 may be incorporated in peripheral expansion device 104.

Figure 3:
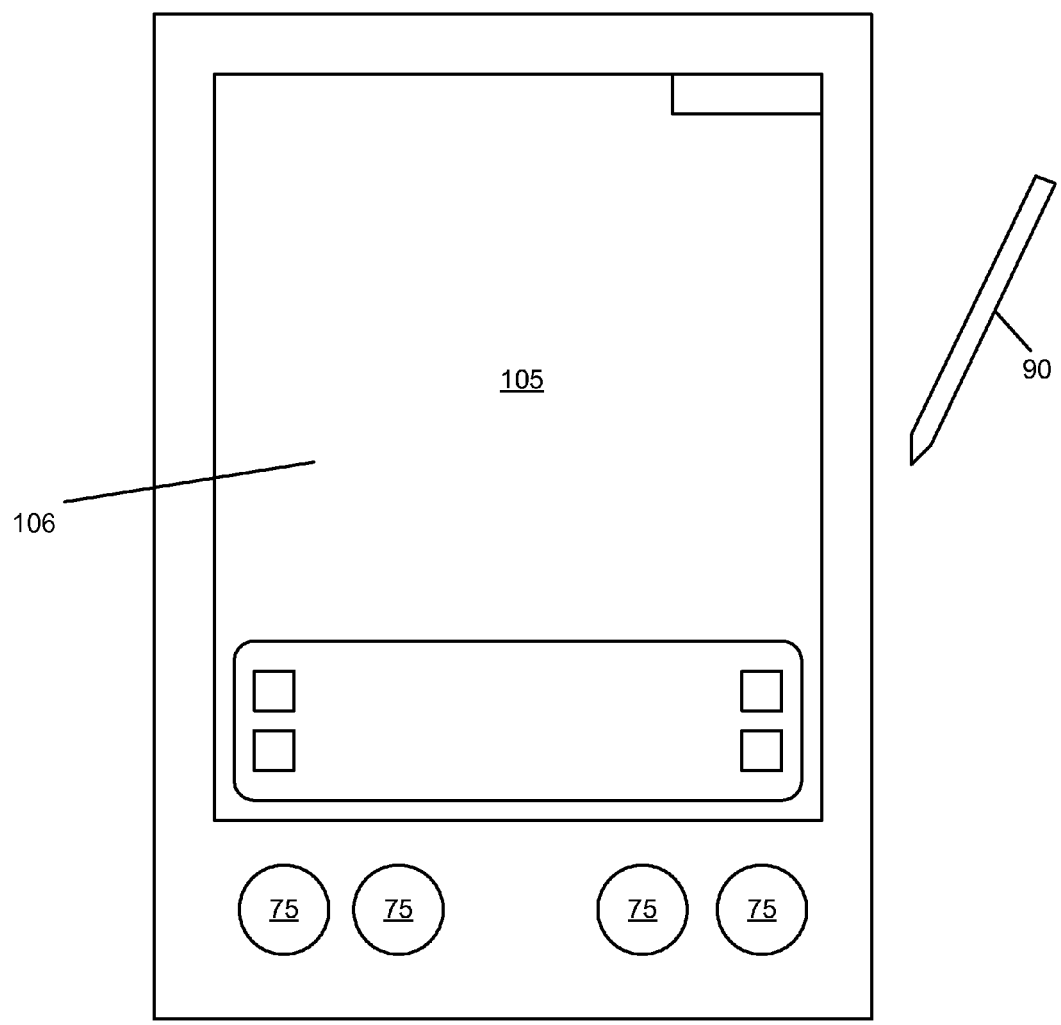
FIG. 3 is an illustration of the top-side face of one embodiment of a portable computer system in accordance with the present invention.

FIG. 3 is an illustration of the top-side face 100a of one embodiment of the portable computer system 100 (FIG. 2) in accordance with the present invention. The top-side face 100a contains one or more dedicated and/or programmable buttons 75 for selecting information and causing the computer system to implement functions.

In the present embodiment, the top-side face 100a contains a display device 105. A removable stylus element 90 is also shown. The display device 105 is a touch screen capable of registering contact between the screen and the tip of the stylus element 90. The top-side face 100a also contains an input device 106 that in one implementation is a stroke or character recognition pad. Input device 106 is a touch screen type of device capable of registering contact with a tip of stylus element 90, and also can register movements of the stylus element. The stylus element 90 can be of any shape and material to make contact with the display device 105 and input device 106.

Figure 4A:
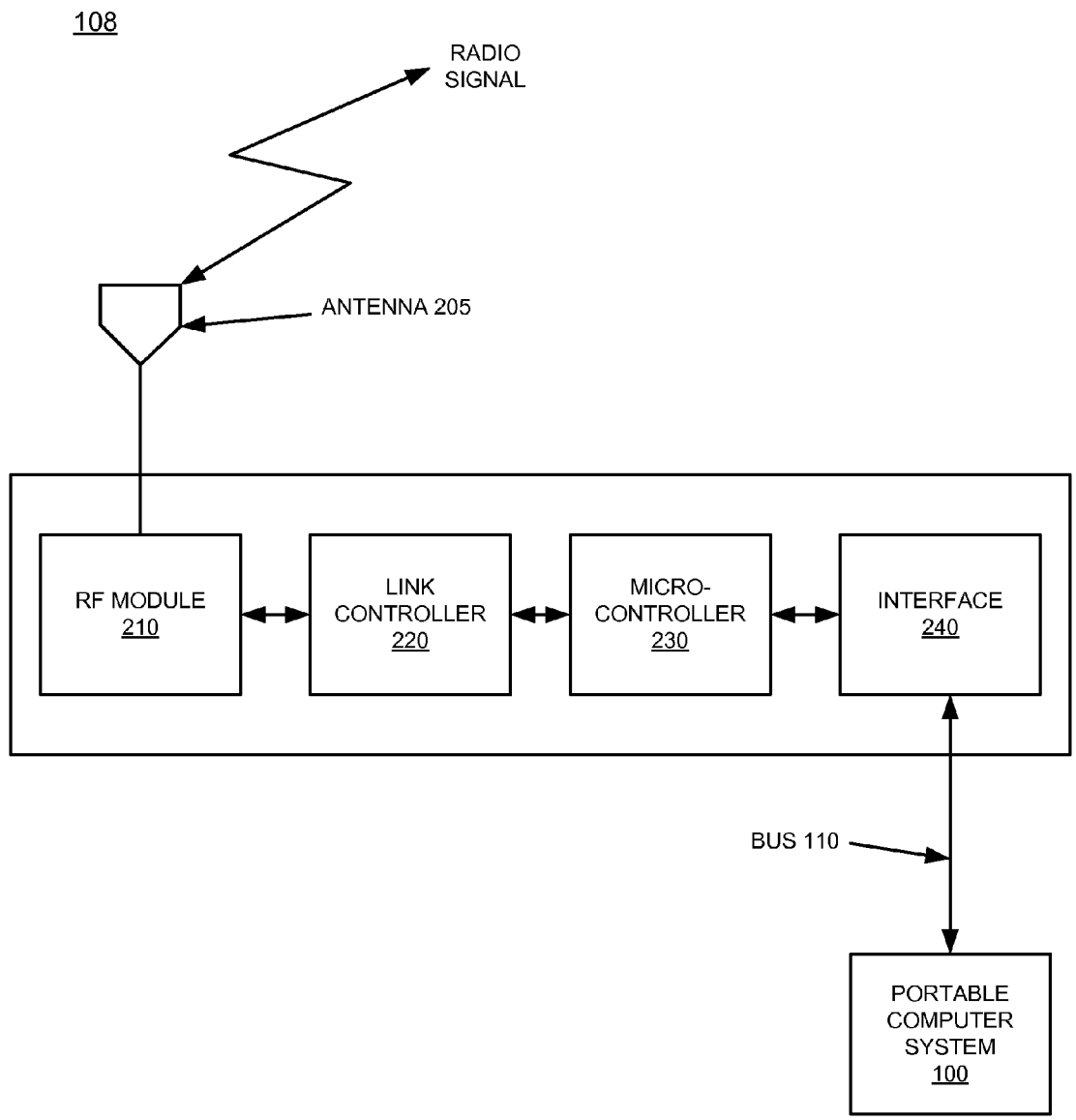
FIGS. 4A and 4B are block diagrams of one embodiment of a transceiver in accordance with the present invention.
Figure 4B:
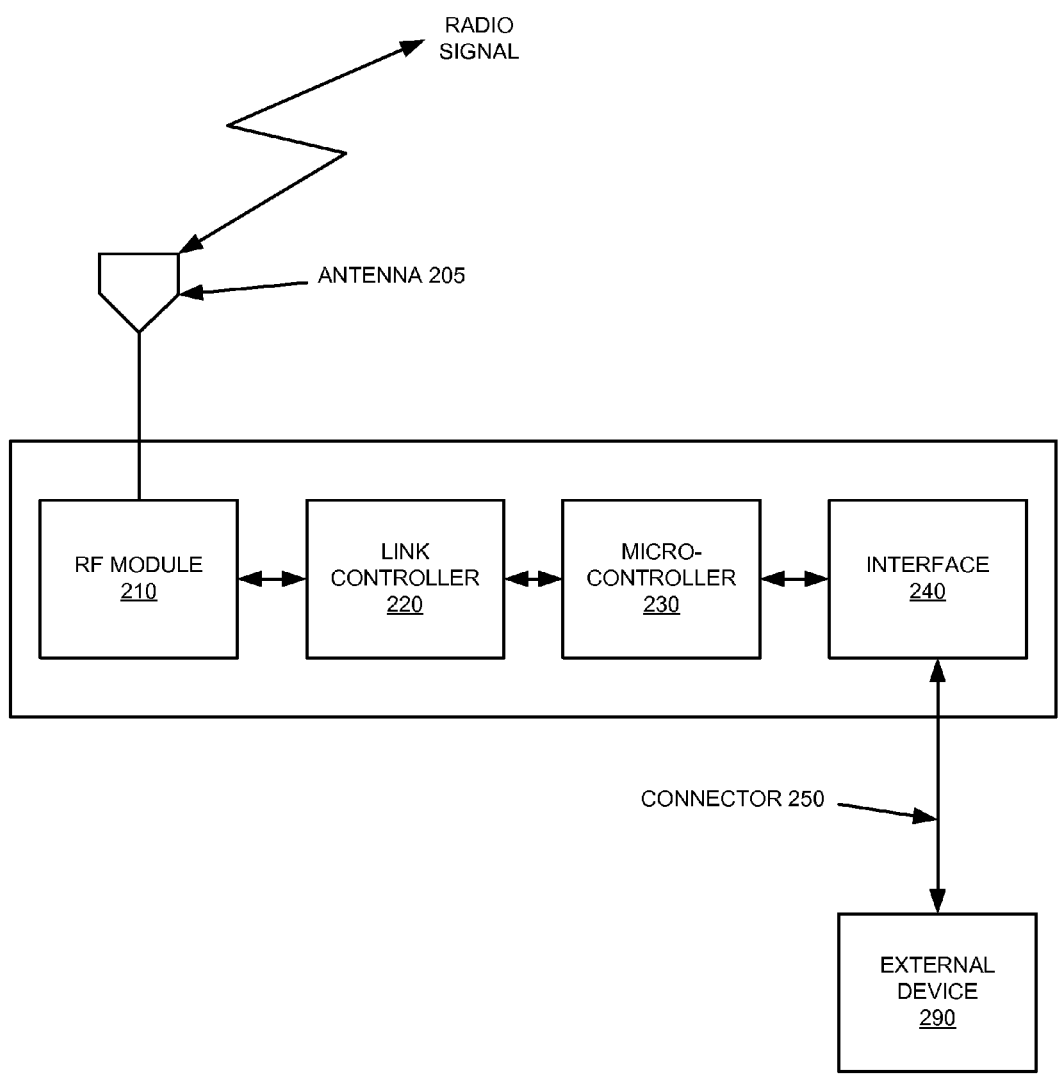

FIGS. 4A and 4B are block diagrams of one embodiment of a transceiver 108 in accordance with the present invention. In a preferred embodiment (the "Bluetooth embodiment"), transceiver 108 is a Bluetooth device comprising a digital component (e.g., a Bluetooth controller) and an analog component (e.g., a Bluetooth radio). In accordance with the present invention, a transceiver 108 is coupled via a system bus 110 to a system or device that will be used to control remote devices (e.g., portable computer system 100 of FIG. 2). Similarly, a transceiver 108 is coupled via a connector 250 to each remote device that is to be controlled (e.g., external device 290).

With reference to both FIGS. 4A and 4B, in the present embodiment, transceiver 108 comprises an antenna 205 for receiving or transmitting radio signals, a radio frequency (RF) module 210, a link controller 220, a microcontroller (or central processing unit) 230, and an external interface 240.

In the Bluetooth embodiment, RF module 210 is a Bluetooth radio. Bluetooth radios operate in the ISM (Industrial, Scientific Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE 802.11 standard. The frequency-hopping scheme is combined with fast ARQ (Automatic Repeat Request), cyclic redundancy check (CRC) and Forward Error Correction (FEC) for data.

In the present embodiment, link controller 220 is a hardware digital signal processor for performing baseband processing as well as other functions such as Quality-of-Service, asynchronous transfers, synchronous transfers, audio coding, and encryption.

In one embodiment, microcontroller 230 is an application specific integrated circuit (ASIC). In the Bluetooth embodiment, microcontroller 230 is a separate central processing unit (CPU) core for managing transceiver 108 and for handling some inquiries and requests without having to involve the host device. In the Bluetooth embodiment, microcontroller 230 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 108 in "sniff" mode, "hold" mode, "park" mode or "standby" mode (refer to FIG. 5 below).

With reference still to FIGS. 4A and 4B, in the present embodiment, interface 240 is for coupling transceiver 108 to portable computer system 100 or to external device 290 in a suitable format (e.g., Secure Digital Card, Memory Stick USB, PCMCIA, PCI, CardBus, PC Card, etc.). In the present embodiment, interface 240 runs software that allows transceiver 108 to interface with portable computer system 100 or external device 290.

Figure 5:
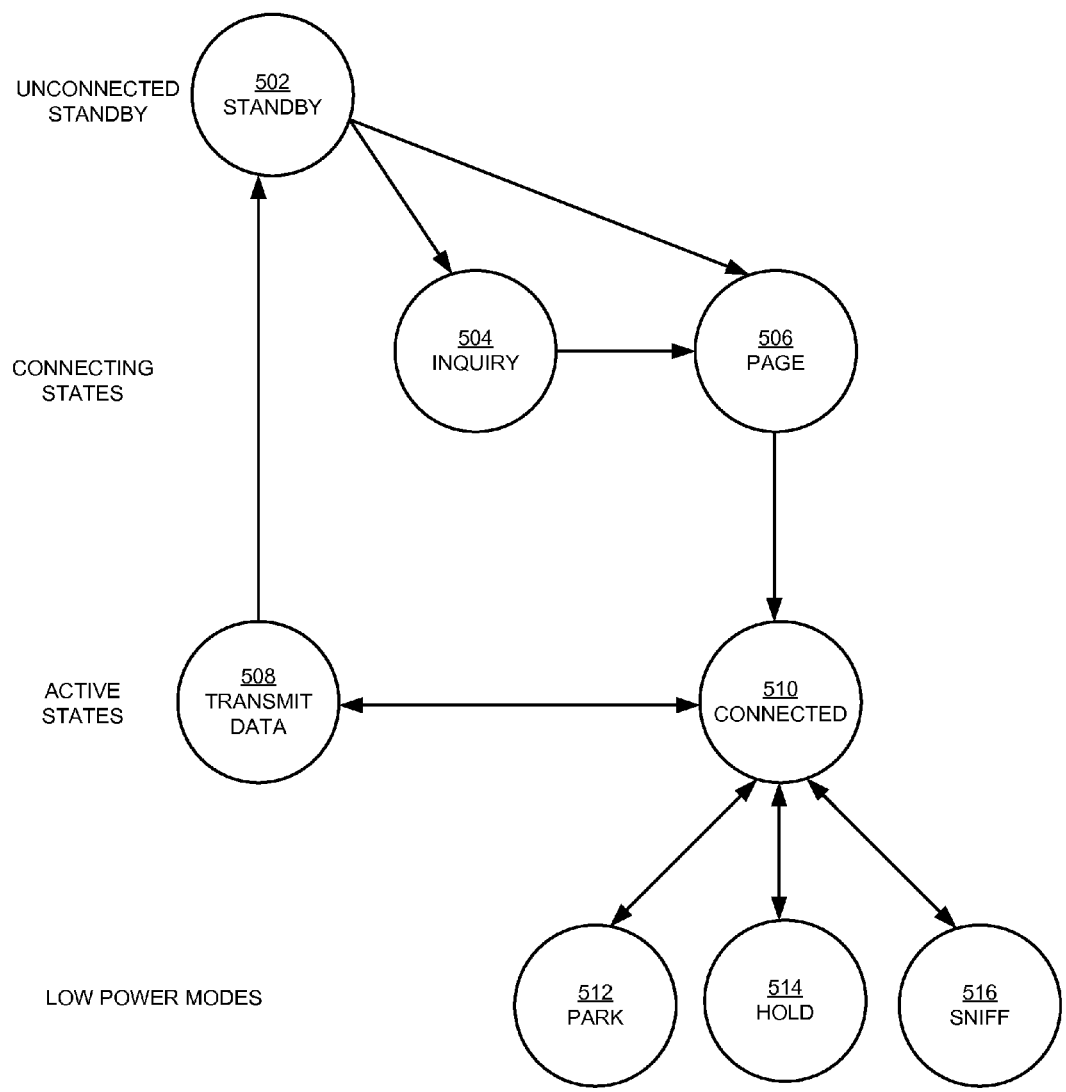
FIG. 5 is a state diagram that illustrates the different operating modes of a wireless transceiver in accordance with one embodiment of the present invention.

FIG. 5 illustrates the different operating modes of a wireless transceiver 108 (FIGS. 4A and 4B) in accordance with one embodiment of the present invention. In the Bluetooth embodiment, before any connections between Bluetooth devices are created, all devices are in standby mode (502). In this mode, an unconnected unit "listens" for messages at a regular rate (e.g., every 1.28 seconds) on a set of hop frequencies defined for that unit. The hold mode (514) is a power saving mode that can be used for connected units if no data need to be transmitted. The sniff mode (516) and park mode (512) are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

A connection between devices is made by a "page" message (506) if the address is already known, or by an "inquiry" message (504) followed by a subsequent page message if the address is unknown. When connected (510), data can be transmitted (508) between devices.

Figure 6:
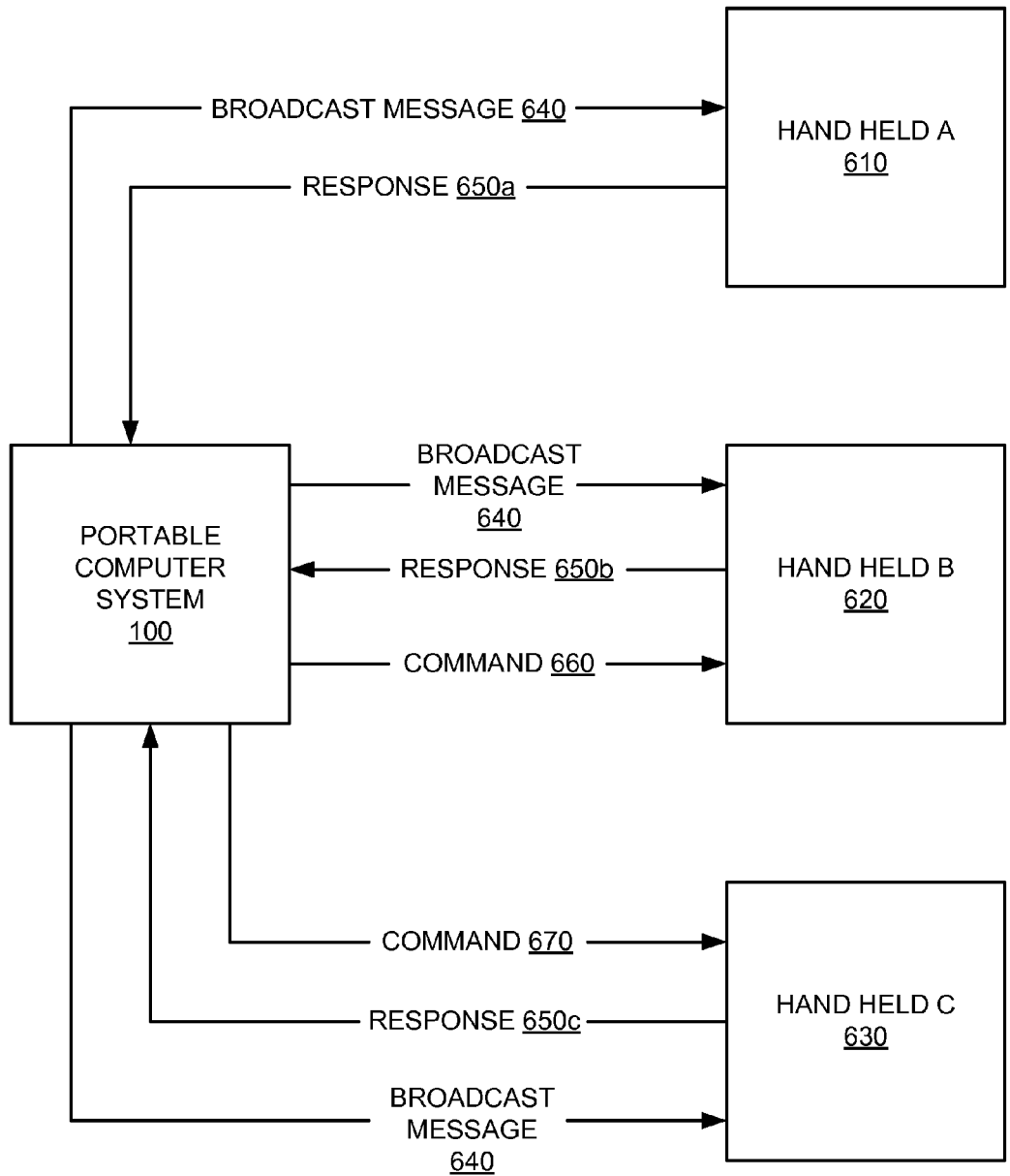
FIG. 6 illustrates a communication flow between Bluetooth compatible devices, according to an embodiment of the present invention.

FIG. 6 illustrates a communication flow between Bluetooth compatible devices, according to an embodiment of the present invention. When it is necessary or desirable to locate and identify compliant devices, a portable computer system, for example hand held computer system 100, may transmit a broadcast message 640 (e.g., an inquiry 504) that is received by compliant devices 610-630, for example, other Bluetooth-enabled hand held computer systems. For example, a user with portable computer system 100 enters a room containing compliant devices 610-630. Portable computer system 100, either automatically or in response to a user input, transmits broadcast message 640 for the purpose of discovering compliant devices in the room.

As compliant devices, hand held computers 610-630 respond to broadcast message 640 via responses 650*a*, 650*b* and 650*c*, respectively. In the present embodiment, responses 650*a-c* include the Medium Access Control (MAC) address for remote devices 610-630. Typically, each remote device is assigned a temporary MAC address for the duration of the connection. All communications between portable computer system 100 and a remote device carry the MAC address of the remote device. Responses 650*a-c* can also include information characterizing, for example, the type and capabilities of each remote device. This information may include an identifier that can be used by portable computer system 100 to characterize the other devices based on information stored in a database or lookup table.

In the present embodiment, when a connection between portable computer system 100 and another hand held computer, for example hand held A 610, has already been established, or when the MAC address of the remote device is known, broadcast message 640 may be a page 506 (FIG. 5) instead of an inquiry 504.

Importantly, the process of one Bluetooth-enabled device finding another Bluetooth device to communicate with, known as "Bluetooth Discovery," is a time consuming, power hungry process. During discovery, a Bluetooth transceiver may send inquiry messages on a periodic basis in an attempt to find another Bluetooth-enabled device. Likewise, Bluetooth transceivers wishing to be "discovered" must periodically turn on and listen for such inquiry messages.

Because of potential differences in the periodic schedules of different Bluetooth devices and possible radio interference, it may takes many tens of seconds to successfully transmit and receive an inquiry message after two or more devices come within communication range. Once an inquiry message is received, the receiving device will typically send an inquiry response packet (message) containing, among other things, its Bluetooth Device Address, often referred to as a Bluetooth identification or ID, or sometimes device ID. This subsequent exchange may take several seconds per device, and in addition is susceptible to interference from other Bluetooth devices attempting to respond to the same inquiry message.

Consequently, developing a list of potential Bluetooth communication "partners" via the Bluetooth Discovery process may require upwards of half a minute, all the while consuming relatively high levels of power for RF transceivers and protocol processing. This is generally seen as an excessive burden to impose on the human users of Bluetooth-enabled devices, such as mobile phones and hand held computers.

Figure 7A:
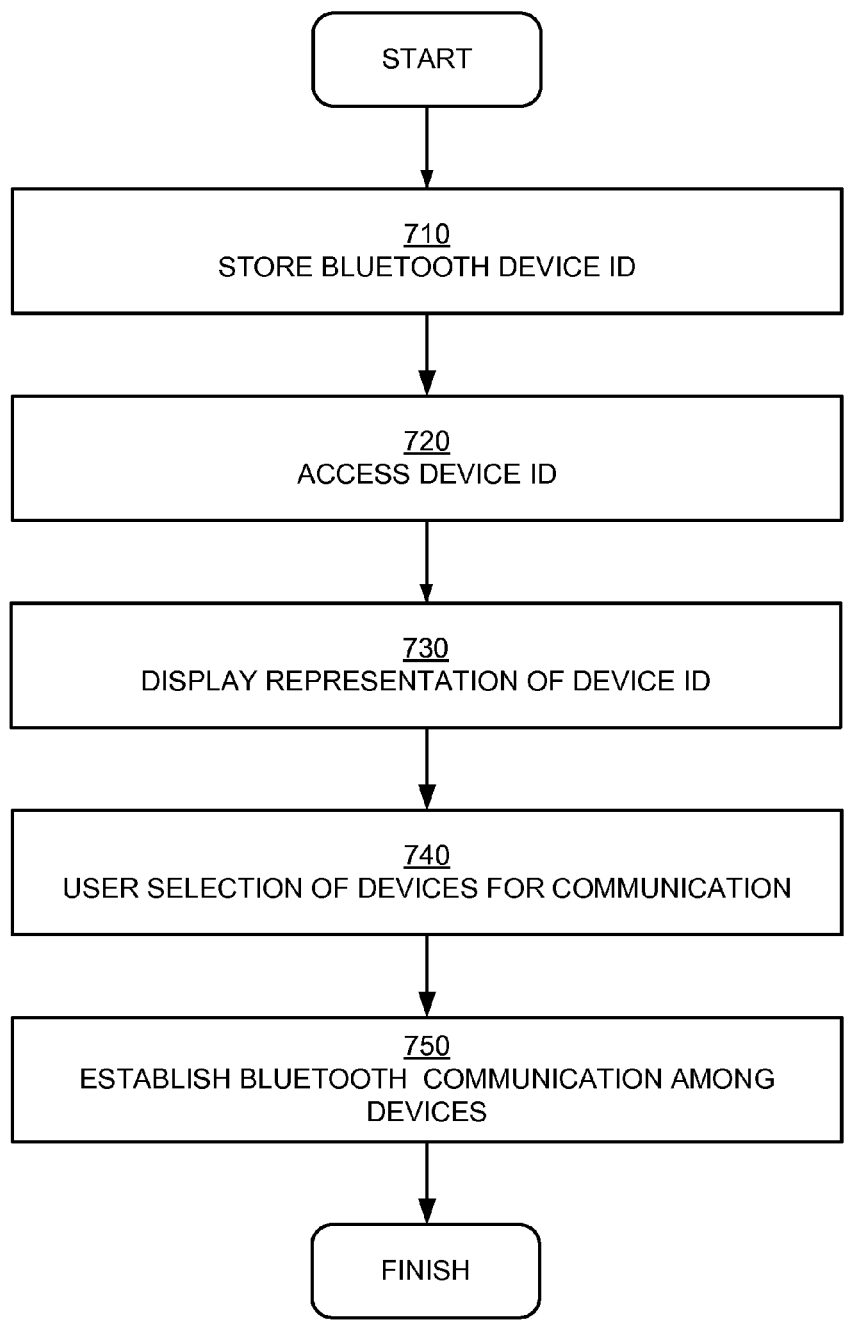
FIG. 7A is a flow diagram of a process of establishing a Bluetooth wireless connection between hand held computers, according to an embodiment of the present invention.

FIG. 7A is a flow diagram of a process 700 for a method of establishing a Bluetooth wireless connection between hand held computers, according to an embodiment of the present invention.

In step 710, a Bluetooth device identification is stored in a hand held computer system. The identification may have been determined automatically in a previous communication, as discussed above in relation to FIG. 6. The device identification may also be entered manually by a user.

In step 720, the device identification previously stored is accessed. It is appreciated that other steps and other processes, not associated with process 700 may take place between steps 710 and 720.

In optional step 730, the device id, or a representation of the id, e.g., a "friendly name" which may be associated with a device identification by a user, may be displayed. A friendly name may be a name or set of characters which is associated with a Bluetooth device address, or ID. A friendly name may be easier for a person, e.g., a user of a Bluetooth enabled hand held, to associate with a device and/or a user than a complex number. For example, a Bluetooth device ID may be "A23 GHE732," while a friendly name may be "Bob."

Figure 11:
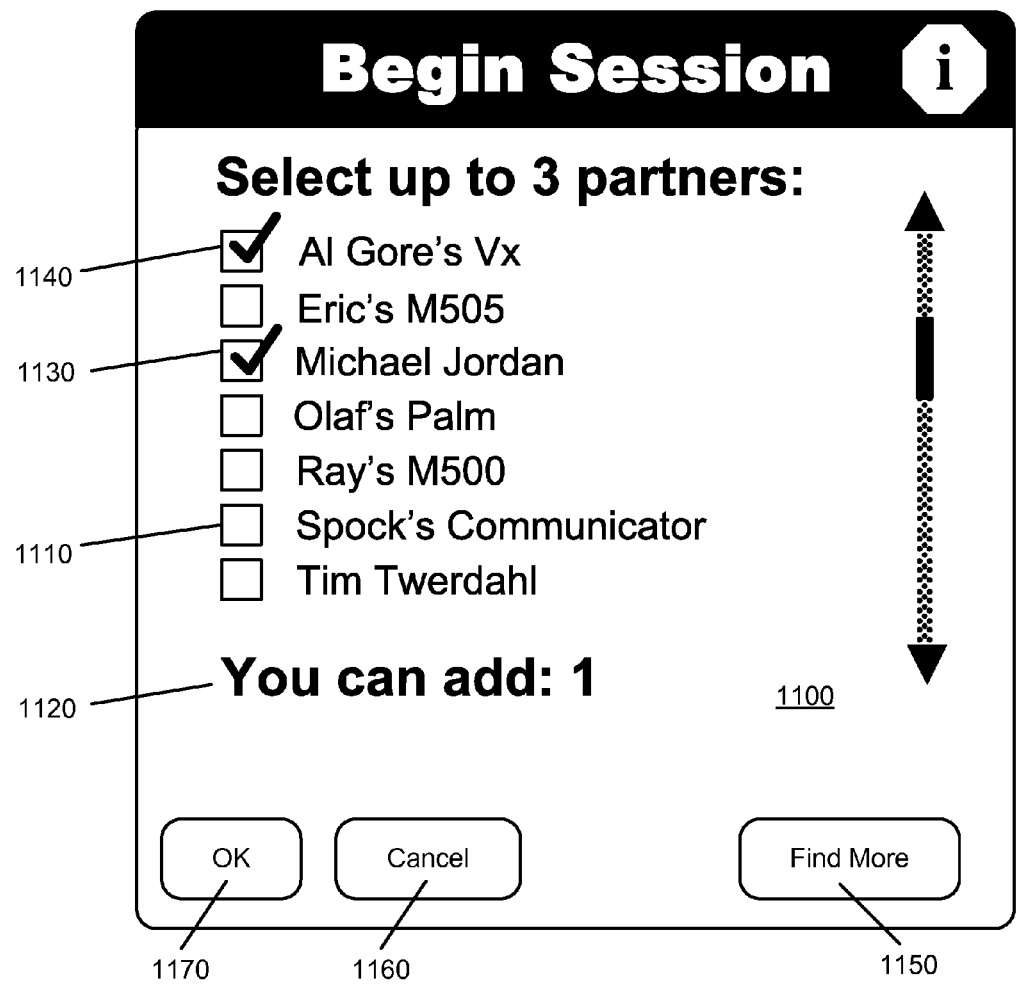
FIG. 11, shows a begin session dialog, according to an embodiment of the present invention.

In optional step 740, a user may be able to select whether to include a particular device identification (or representation thereof) in a Bluetooth communication. The selection may take the form of checking a box drawn on the display, as shown in FIG. 11.

In step 750, the Bluetooth connection may be established without using an inquiry message, for example inquiry 504 of FIG. 5.

Figure 7B:
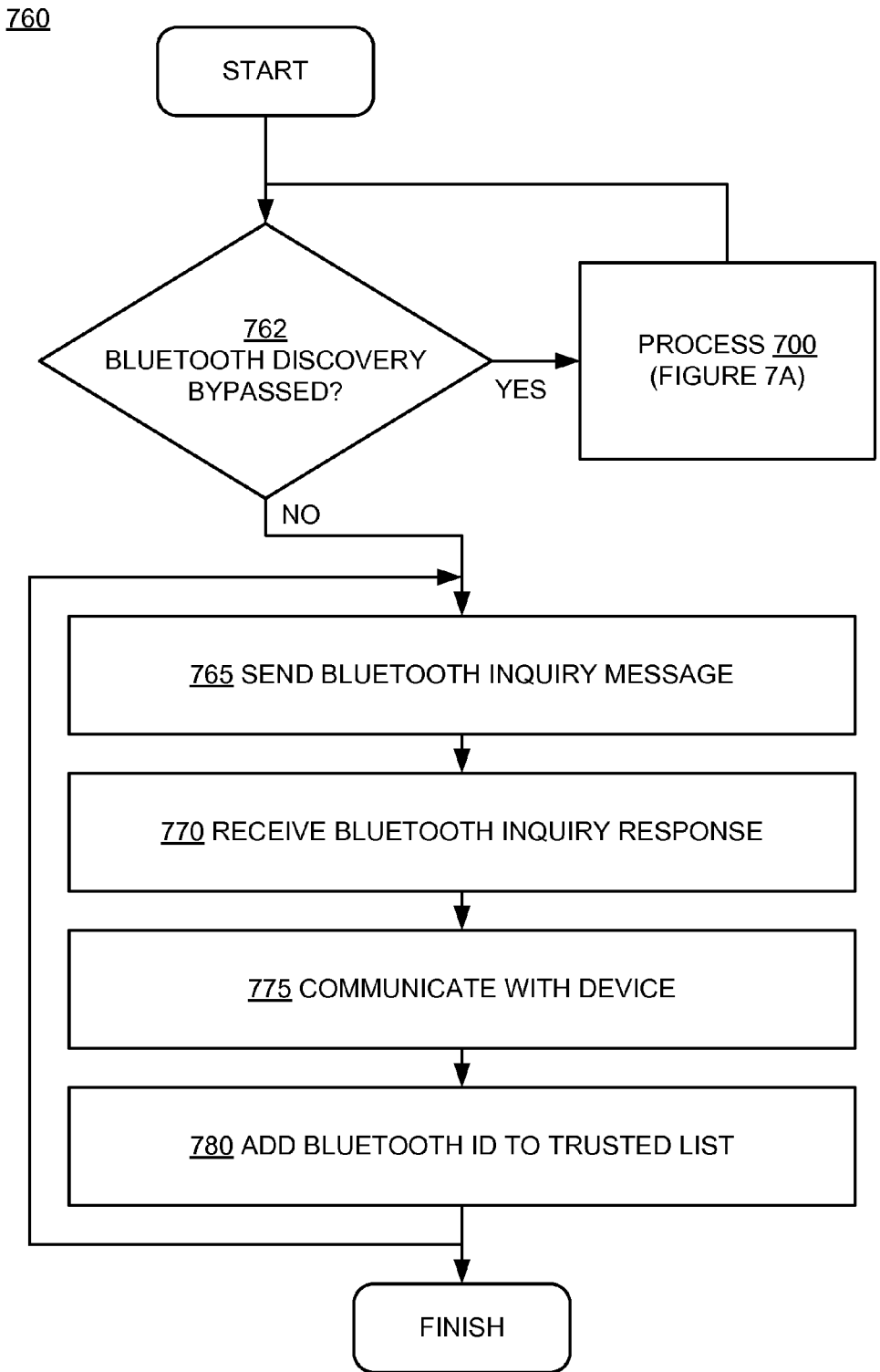
FIG. 7B is a flow diagram of a process of establishing a Bluetooth wireless connection between hand held computers, according to an embodiment of the present invention.

FIG. 7B is a flow diagram of a process 760 for a method of establishing a Bluetooth wireless connection between hand held computers, according to an embodiment of the present invention.

In step 762, a hand held computer may determine if it has been set to bypass the Bluetooth discovery process. It may be set, for example, as a result of a user selection, or as a result of a failure of process 700 to establish communication. If discovery is to be bypassed, flow proceeds to process 700 as described in FIG. 7A.

If discovery is not to be bypassed, process flow may continue to step 765. In step 765, the hand held computer may transmit a Bluetooth inquiry message. Responsive to the inquiry message, a second hand held computer may transmit a Bluetooth inquiry response message (not shown) which may be received by the hand held computer in step 770.

In optional step 775, a communication session may be established with the second hand held computer. In step 780, the Bluetooth ID of the other hand held computer may be added to a list of trusted device IDs stored in a memory list of the first hand held computer. Adding the ID to the trusted device list may require user intervention or approval, or it may be performed automatically.

Steps 865 through 880 may be repeated for multiple Bluetooth enabled devices prior to the completion of process 760.

Figure 8:
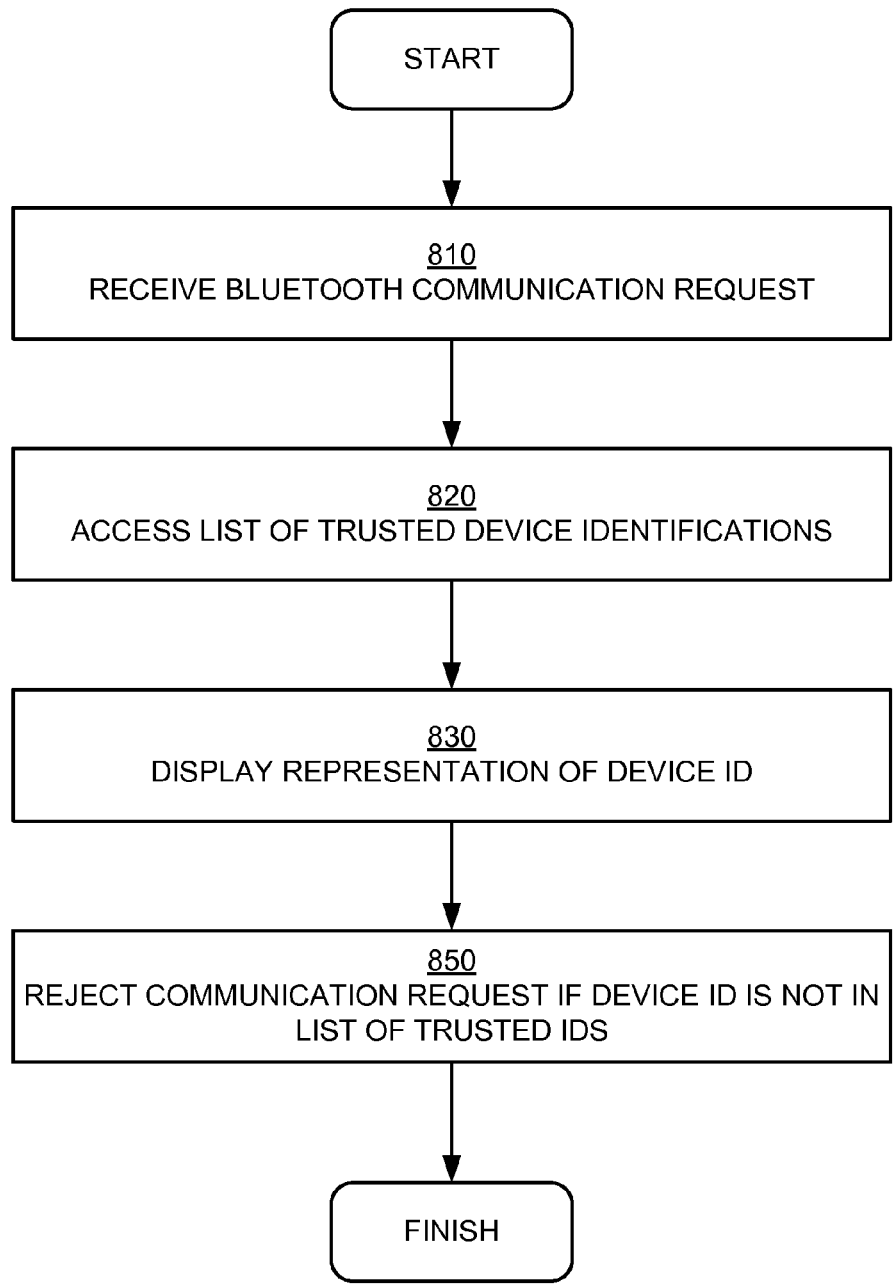
FIG. 8 is a flow diagram of a method of rejecting a Bluetooth communication request, according to an embodiment of the present invention.

FIG. 8 is a flow diagram of a process 800 for a method of rejecting a Bluetooth communication request, according to an embodiment of the present invention.

In step 810, a Bluetooth communication request may be received by a hand held computer system. The request may take the form of a page message, for example page message 506, or an inquiry message, for example inquiry message 504. It is appreciated that other well known forms of communication request are well suited to embodiments of the present invention. The communications request may, and generally will, include a device identifier, also known as a device identity or id.

In step 820, a list of trusted device identifications may be accessed on the hand held computer system.

In step optional step 830, a representation of the device identity may be displayed on the hand held computer system. The representation may take the form of a Bluetooth friendly name.

In step 850, communications, and more particularly the Bluetooth communications request may be rejected if the device identity is not in a list of trusted device IDs.

Figure 9:
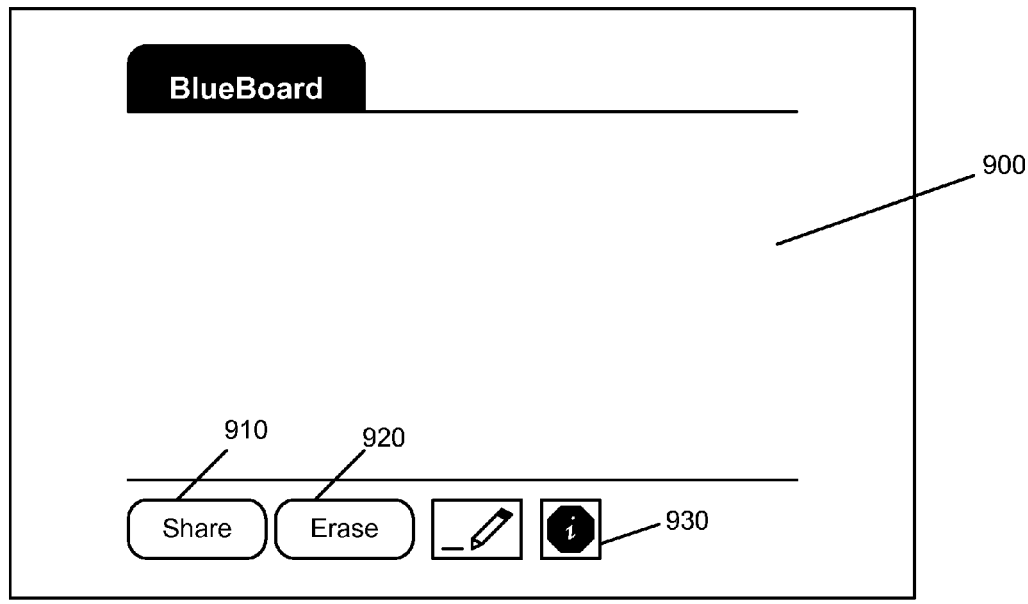
FIG. 9 shows an initial display screen image of a collaborative drawing software application, according to an embodiment of the present invention.

FIG. 9 shows an initial display screen image 900 of a collaborative drawing software, according to an embodiment of the present invention. Image 900 may be displayed on display device 105 of system 100. Image 900 may contain several buttons rendered on display device 105, for example share button 910 and erase button 920. A touch action, for example stylus 90 pressing on digitizer 106, may initiate an action associated with the button.

According to an embodiment of the present invention, a color wheel, for example color wheel 930, may be displayed as the right most item in the control space of the drawing screen. In accordance with an embodiment of the present invention, color wheel 930 may not be displayed on a monochrome device.

Color wheel 930 may be filled with substantially 90 degree wedges of the possible pen colors (Black, Red, Blue, and Green). An outline around one 90 degree wedge shows the current color for that device.

According to an embodiment of the present invention, when collaborative drawing software is initialized, users may be presented with the blank drawing area illustrated in FIG. 9.

Figure 10:
FIG. 10 shows a display screen image of a collaborative drawing software application, according to an embodiment of the present invention.

FIG. 10 shows a display screen image 1030 of a collaborative drawing software, according to an embodiment of the present invention. A user may draw in the drawing area, even though they may be not connected with other Bluetooth users at the present time.

The first user in a collaborative group to select the share 910 button may become the host. The host may invite other collaborative drawing software users (partners) to join in a shared drawing.

If collaborative drawing software is being run for the first time and/or there is no stored list of recent contributors, tapping share may causes embodiments of the present invention to discover all Bluetooth-enabled hand held computers within range. The potential partners discovered may be displayed in begin session dialog 1100 as shown in FIG. 11, according to an embodiment of the present invention.

If the host device has previously participated in a collaborative drawing using embodiments of the present invention, the Begin session dialog 1100 may display a list of their recent partners from previous collaborative drawing software sessions in the Begin session dialog 1100. This speeds the setup process when consistently working with a small group, as the Bluetooth discovery process is not needed.

Selection of partners may be aided by the use of check boxes, for example check box 1110. A touch action within the general area of a check box will select the indicated device/person. Check box 1140 shows feedback provided after such a touch action, indicating that "Al Gore's Vx" has been included in the collaborative drawing session. In a similar manner, check box 1230 indicates that "Michael Jordan" has been included.

FIG. 11 shows a begin session dialog 1100 after the host has selected 2 potential partners to add to their collaborative drawing. Begin session dialog 110 may scroll to list additional possible members, and may by sorted in ascending alphabetic order.

According to an embodiment of the present invention, collaborative drawing software may allow a maximum of four people to share a drawing. In this case, a decrementing counter 1120 is displayed in dialog 1100, showing the host how many more partners may be added to share the drawing. The counter may decrement and increment from three to zero as users select the check boxes for partners in the list. The host may be prevented from selecting additional check boxes when the counter reaches zero.

Still referring to FIG. 11, a touch action on the Find More button 1150 may discover all hand held computer systems within range and validate the list of recent partner(s) previously selected. The logic presented in Table 1 below may by used to refresh the scrolling list:

TABLE 1

| Rule | Action |
| --- | --- |
| If a recent partner displayed on the previous list was selected and is discoverable | The partner and the associated checkbox state are added to the refreshed list. |
| If a recent partner displayed on the previous list was selected but is not discoverable | The partner is added to the refreshed list, and the friendly name is in bold. The string "Not Found" is appended to the partner name, and the friendly name is truncated till the truncated friendly name and " . . . Not Found" fits on the single line. |
| If a recent partner displayed on the previous list was not selected but is discoverable | The partner and the associated checkbox state are added to the refreshed list. |
| If a recent contributor displayed on the previous list was not selected and is not discoverable | Remove the name from the refreshed scrolling list |
| If a new potential partner is discovered (Bluetooth network address doesn't match any recent contributors) | Add the friendly name to the refreshed scrolling list with no checkbox selection. |

Figure 12:
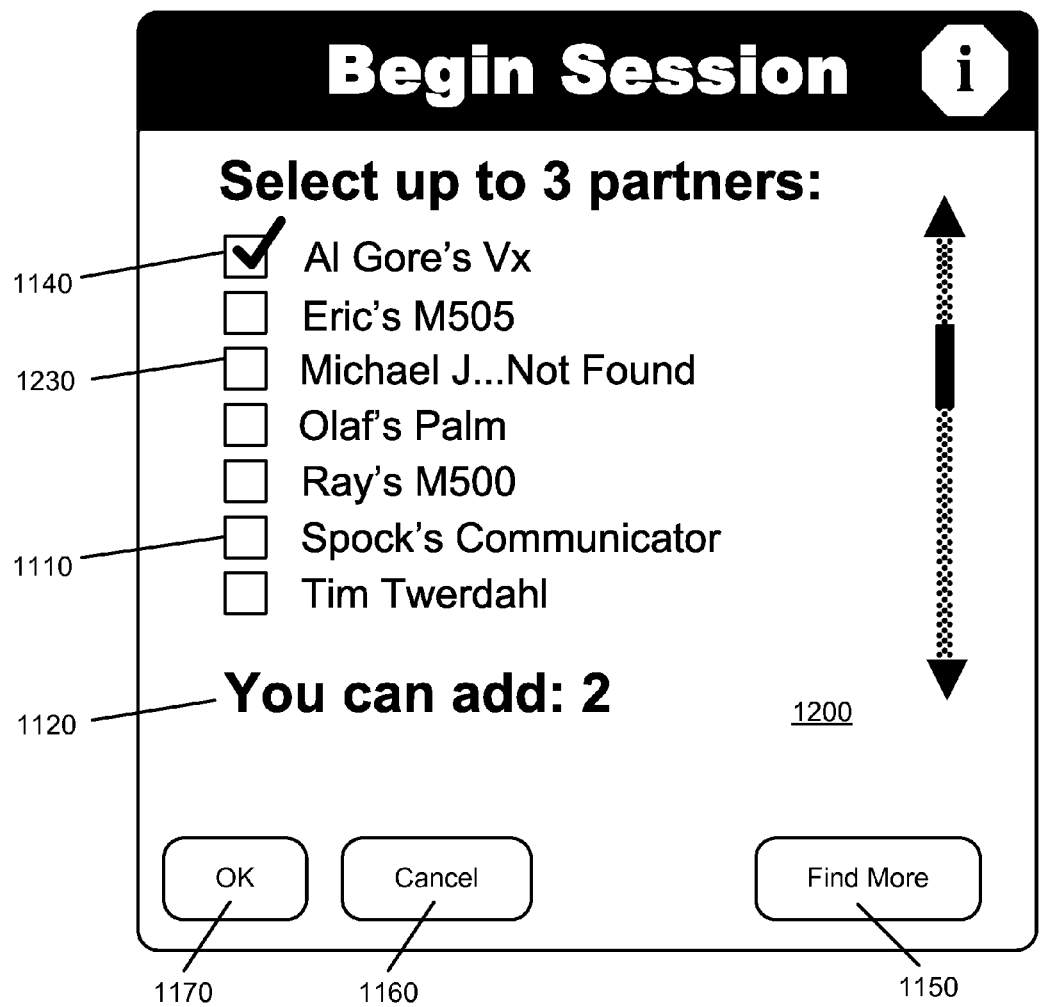
FIG. 12 shows a select partners dialog after processing the find more button, according to an embodiment of the present invention.

FIG. 12 shows a select partners dialog 1200 after processing the find more 1150 button, according to an embodiment of the present invention.

Line 1230 indicates that "Michael J" was selected for inclusion based upon a previous communication, i.e., that device has participated in a collaborative drawing and/or the device identification was know. However, that device has not responded to a page message, for example page message 506. Counter 1120 has been updated to show that two more participants may be allowed into the session.

According to an embodiment of the present invention, a touch action on the cancel button 1160 as shown in FIGS. 11 and 12 may return the host to the main screen (as shown in FIG. 1 or 2) without initiating Bluetooth connections.

According to an embodiment of the present invention, a touch action on the OK button 1170 as shown in FIGS. 11 and 12 may start the Bluetooth connection for all potential partners with a selected check box by their names.

A Bluetooth piconet may be established between all of the contributors and the host.

If no potential partners have been selected, the OK button may return the user to the main screen where they can draw without any other partners if they wish.

After the OK button 1170 is tapped, embodiments of the present invention attempt to open connections to each of the selected partners. If the host selects a partner that does not have collaborative drawing software installed on their hand held device, the error dialog 1300 illustrated in FIG. 13 may alert the host to this problem, according to an embodiment of the present invention.

Assuming that all the partners have collaborative drawing software installed on their hand held devices, the connection process may establish connections with all of the selected partners. The host's handheld may display a connection dialog 1400, illustrated in FIG. 14, telling them which partner their hand held device is currently connecting to. According to an embodiment of the present invention, the partner's Bluetooth friendly name may appear on a separate line to support long names, as shown in dialog 1400.

If the host taps the Cancel button 1410, embodiments of the present invention may abort the connection process to that partner and begin the connection process to the next partner. If no more partner connections are needed, the pico net is completed. If no connections were made, then the user is returned to the main screen illustrated in FIG. 9 or 10.

The preferred embodiment of the present invention bypassing Bluetooth discovery for devices in a special list is thus described. While the present invention has been described in particular embodiments, it should be appreciated that the present invention should not be construed as limited by such embodiments, but rather construed according to the below claims.

What is claimed is:

1. A method of establishing a Bluetooth wireless connection between hand-held computers comprising:
   a) storing a Bluetooth device identification of a first hand-held computer system on a memory resident list of a second hand-held computer system;
   b) in response to a request from said first hand-held computer system to establish communication between said first and second hand-held computer systems, accessing said device identification of said first hand-held computer system on said second hand-held computer system; and
   c) establishing a Bluetooth connection between said first and second hand-held computer systems by sending a Bluetooth page message from said second hand-held computer system to said first handheld computer system without need of a Bluetooth inquiry message, wherein said establishing in c) bypasses standard Bluetooth discovery processes.

2. The method as described in claim 1 wherein said device identification is automatically determined in a two-way communication between said first and said second hand-held computer systems prior to said c).

3. The method as described in claim 1 wherein said device identification is unknown to said second hand-held computer system and is entered by a user of said second hand-held computer system.

4. The method as described in claim 1 wherein said b) further comprises:
   b1) accessing said device identification;
   b2) displaying a representation of said device identification on a display of said second hand-held computer system; and
   b3) including said device identification in said Bluetooth wireless connection.

5. The method as described in claim 4 wherein said representation of said device identification is a Bluetooth friendly name.

6. The method as described in claim 1 further comprising:
   d) responsive to a failure of said c), beginning a Bluetooth discovery process.

7. A hand-held computer system comprising:
   a bus;
   a Bluetooth radio coupled to said bus;
   a processor coupled to said bus; and
   a memory coupled to said bus, wherein said memory comprises instructions that when executed implement a method of establishing a Bluetooth wireless connection between hand-held computers, said method comprising:
   a) storing a Bluetooth device identification of a first hand-held computer system on a memory resident list of a second hand-held computer system;
   b) in response to a request from said first hand-held computer system to establish communication between said first and second hand-held computer systems, accessing said device identification of said first hand-held computer system on said second hand-held computer system; and
   c) establishing a Bluetooth connection between said first and second hand-held computer systems by sending a Bluetooth page message from said second hand-held computer system to said first handheld hand-held computer system without need of a Bluetooth inquiry message, wherein said establishing in c) bypasses standard Bluetooth discovery processes.

8. The hand-held computer system as described in claim 7 wherein said device identification is automatically determined in a two-way communication between said first and said second hand-held computer systems prior to said c).

9. The hand-held computer system as described in claim 7 wherein said device identification is unknown to said second hand-held computer system and is entered by a user of said second hand-held computer system.

10. The hand-held computer system as described in claim 7 wherein said b) further comprises:
    b1) accessing said device identification;
    b2) displaying a representation of said device identification on a display of said second hand-held computer system; and
    b3) selecting to include said device identification in said Bluetooth wireless connection.

11. The hand-held computer system as described in claim 10 wherein said representation of said device identification is a Bluetooth friendly name.

12. The hand-held computer system as described in claim 7 further comprising:
    d) responsive to a failure of said c), beginning a Bluetooth discovery process.

13. A method of establishing a Bluetooth wireless connection between hand-held computers comprising:
    a) storing a plurality of Bluetooth device identifications corresponding to a plurality of hand-held computer systems on a memory resident list of a specific hand-held computer system;
    b) in response to a request from said first hand-held computer system to establish communication among said plurality of hand-held computer systems accessing said plurality of Bluetooth device identifications on said specific hand-held computer system; and c) establishing a Bluetooth connection among said plurality of hand-held computer systems by sending a page message from said specific hand-held computer system to said plurality of hand-held computer systems without need of a Bluetooth inquiry message, wherein said establishing in c) bypasses standard Bluetooth discovery processes.

14. The method as described in claim 13 wherein at least one of said plurality of Bluetooth device identifications is automatically determined in two-way communications between said particular hand-held computer system and members of said plurality of hand-held computer systems prior to said c).

15. The method as described in claim 14 wherein said b) further comprises:
- b1) accessing said plurality of device identifications;
- b2) displaying representations of said plurality of device identifications on a display of said particular hand-held computer system; and
- b3) including at least one hand-held computer system corresponding to one of said plurality of Bluetooth device identifications in said Bluetooth wireless connection.

16. The method as described in claim 15 wherein at least one of said representations of said plurality of device identifications is a Bluetooth friendly name.

17. The method as described in claim 14 further comprising:
- d) responsive to a failure to establish a Bluetooth connection between said specific hand-held computer system and said plurality of hand-held computer systems, automatically initiating a Bluetooth discovery process.

18. The method as described in claim 13 wherein at least one of said plurality of Bluetooth device identifications is unknown to said second hand-held computer system and is entered by a user of said second hand-held computer system.

* * * * *